May 16, 1939.  E. L. BARRETT  2,158,100
SHAFT COUPLING
Filed May 21, 1938
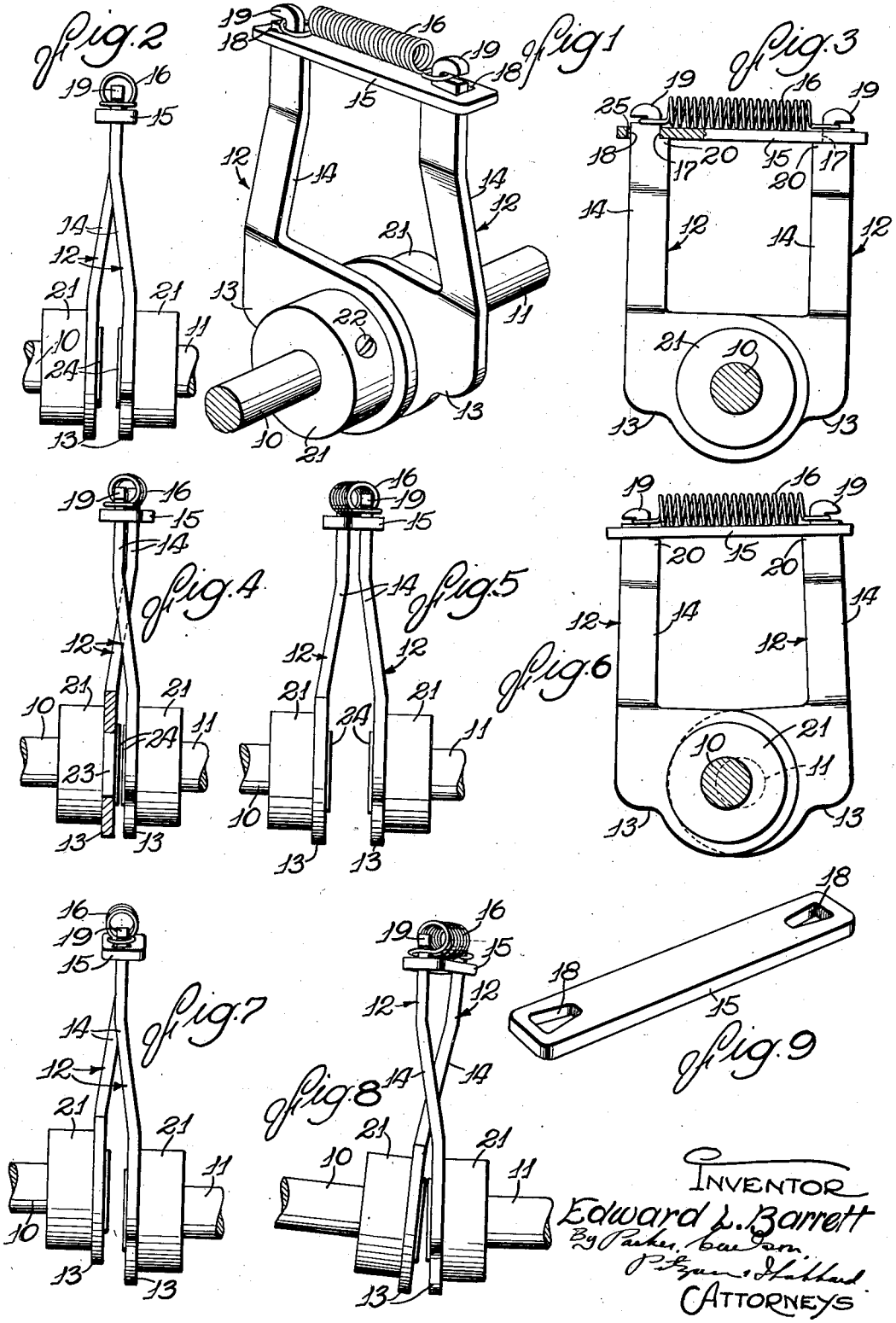

Patented May 16, 1939

2,158,100

UNITED STATES PATENT OFFICE 2,158,100

SHAFT COUPLING

Edward L. Barrett, La Grange, Ill., assignor to Utah Radio Products Company, Chicago, Ill., a corporation of Illinois Application May 21, 1938, Serial No. 209,252

3 Claims. (Cl. 64—11)

The invention relates to torque transmission couplings for rotatable generally alined shafts and similar members. The term "shaft" as used herein is intended to embrace all shapes of rotatable driving and driven members irrespective of whether or not they may be of the elongated, round bar shape commonly designated as a shaft.

The general object of the invention is to provide a coupling of the character described which is economical to make, rugged in construction, and effective in operation to permit a large tolerance in shaft alinement without imposing strains on the shafts or coupling parts.

More specifically it is an object of the invention to provide a coupling of the character described which is adapted to form an effective driving connection between two rotatable shafts which are shiftable axially relative to each other from some mid-position, and which will permit such axial shifting movement despite misalinement of the shafts due to either angular or lateral displacement of their axes.

Further objects and advantages of the invention will become apparent as the following description proceeds taken in conjunction with the accompanying drawing in which:

Figure 1 is a perspective view of a coupling embodying the invention;

Fig. 2 is a side elevation of the coupling shown in Fig. 1;

Fig. 3 is an end elevation partly in section of the coupling of Fig. 1;

Figs. 4 and 5 are side elevations illustrating the positions of the parts of the coupling when the shafts which it connects are axially displaced in various positions;

Figs. 6 and 7 are respectively end and side elevations of the coupling with the shafts laterally displaced or misalined in various positions;

Fig. 8 is a side elevation of the coupling illustrating the relative position of the parts when the shafts are angularly misalined;

Fig. 9 is an enlarged detail perspective view of a connecting link included in the coupling.

For purposes of illustration of its various novel features, the invention has been shown herein (Fig. 1) as embodied in a coupling for two rotatable driving and driven shafts 10 and 11. The coupling is equally adapted for transmitting torque from either shaft to the other and accordingly either one of the shafts 10 and 11 may be the driver. This coupling is designed particularly to transmit rotational movement between the shafts when one or both of them is arranged for axial sliding movement with respect to the other.

The coupling embodies, in general, two laterally extending members designated generally by the numeral 12 which are adapted to be secured to the respective shafts 10 and 11. In the preferred embodiment illustrated these members are identical in construction and are fashioned as stampings from sheet metal. The cost of the coupling is minimized not only by utilizing sheet metal stampings, but also by using duplicate structures for the two members 12. Each of these members 12 is generally L-shaped with a base arm 13 and a second or upright arm 14. The term "upright" is used herein simply for convenience of designation in order to distinguish the two parts of the L-shaped members although it is apparent that in the operation of the coupling, the arms 14 will be rotated about the shaft axes.

The outer ends of the upright arms 14 are joined by a loosely connected rigid link 15, which may also conveniently and economically be fashioned as a stamping from sheet metal. A helical tension spring 16 urges the upright arms 14 toward each other so that opposed bearing surfaces at 17 (Fig. 3) on the outer end portions thereof abut against the opposite end portions of the link 15. In order to retain the link 15 in position on the arms while permitting relative swiveling movement therebetween incident to axial displacement of the shafts 10—11, apertures or slots 18 (Fig. 9) are fashioned in the link to fit loosely about the arms 14.

The spring 16 is also preferably utilized in holding the link 15 in position. In the preferred construction illustrated, the spring 16 is anchored at its opposite ends to integral hooks 19, formed on the arms 14. These hooks are so positioned that the inner side of the spring will press against the adjacent upper surface of the link 15 and hold it against outwardly facing supporting shoulders 20 (Fig. 3) on the upright arms 14.

The two laterally projecting members 12 are secured to their respective shafts 10 and 11 by bushings 21 having set screws 22 threaded therein and bearing against the shafts (Fig. 1). Each of these bushings has a reduced end portion 23 (Fig. 4) inserted in a corresponding aperture in the base leg 13 of the member 12 and the inner end of the bushings is peened over as indicated at 24 in order to hold the member 12 fast against rotation on the supporting bushings.

In order that the swiveling motion of the link 15 shall be symmetrical about its center upon axial adjustment of the shafts 10 and 11, in either direction from a normal or mid-position, the upright arms 14 are offset into a common plane intermediate the spaced base arms 13 (Fig. 2). Accordingly, when the shafts are moved axially toward each other (Fig. 4) or away from each other (Fig. 5) from their normal mid-position (Fig. 2), the link 15 simply swivels in one direction or the other about its center. No impedimet to this swiveling motion is offered at the joints between the upright arms 14 and the link 15 in view of the clearances provided in the link apertures 18. These apertures are preferably tapered with their large ends facing outward (Fig. 9) and are of sufficient length so as to afford ample clearance at 25 (Fig. 3). In this way maximum axial displacement of the shafts is permitted without any interference due to jamming of any of the coupling parts.

In any of the axial positions noted for the shafts 10—11, torque is effectively transmitted by the coupling. The one of the arm members 12, which is secured to the driving shaft, exerts a thrust on the abutting end of the link 15 which is transmitted through this link to the other one of the arm members, this latter member being attached to the driven shaft. Consequently, the rotative force exerted by the driving member is transmitted to the driven member entirely through rigid coupling elements no matter what the relative axial positions of the shafts may be.

The spring 16 yieldably holds the parts of the coupling in operative relation despite misalinement of the shafts so that the coupling in effect forms a universal joint. This characteristic of the coupling is particularly important in view of the fact that a large tolerance can be allowed in setting up the bearings of the shafts and the cost of manufacture of the device in which they are incorporated can thereby be materially reduced. Figs. 6 and 7 illustrate respectively the positions of the coupling parts when the shafts are displaced or misalined in a horizontal plane and in a vertical plane. Similarly, Fig. 8 illustrates the positions of the coupling parts when the shafts are angularly misalined. In each case, it will be seen that the coupling accommodates itself to the various shaft positions and that the function of transmitting torque therebetween is in no way impaired.

Although a particular embodiment of the invention has been shown and described in some detail for illustration of its various novel features, there is no intention thereby to limit the invention to such embodiment but, on the other hand, the appended claims are intended to cover all modifications and alternative constructions within the spirit and scope of the invention.

I claim as my invention:

1. A coupling for transmitting torque between two generally axially alined driving and driven members while permitting axial displacement therebetween as well as axial misalinement comprising, in combination, two arms adapted to be secured respectively to the driving and driven members in a position to project laterally outward from the axes thereof with the end portions of said arms spaced apart transversely of said axes and with the base portions of said arms spaced apart along said axes, said outer end portions of said arms presenting respective opposed bearing surfaces, a rigid link extending between said outer end portions of said arms and loosely engaging the same, and means for yieldably urging said outer end portions of said arms toward each other with said opposed bearing surfaces abutting against the opposite end portions of said loosely mounted link, said outer end portions of said arms being offset out of the planes of the base portions thereof to lie in a common plane intermediate the latter to effect a symmetrical swiveling motion of said link about its center upon displacement of the driving and driven members axially toward or away from each other.

2. A coupling for transmitting torque between two generally axially alined driving and driven members while permitting axial displacement therebetween as well as axial misalinement comprising, in combination, two substantially identical L-shaped sheet metal members disposed with the upright arms thereof in generally parallel spaced relation and the base arms thereof overlying each other in spaced relation and extending in opposite directions, bushings having alined openings therein fixed to said base arms for securing the same to the driving and driven members respectively, said upright arms being offset out of the spaced planes of said base arms into a common plane lying therebetween, said upright arms having outwardly facing shoulders thereon adjacent their outer ends, a transverse rigid connecting link extending between said upper arms and resting on said shoulders, said link having inwardly tapering apertures therein adjacent its respective ends fitting loosely about the outer end portions of said upright arms, and means including a helical tension spring anchored at its opposite ends to the end portions of said upright arms outside said link and lying along the outer face thereof for urging said arms toward each other into abutment with the inner ends of said link apertures and for pressing said link against said shoulders.

3. A coupling of the type described comprising, in combination, two substantially identical L-shaped sheet metal members disposed with the upright arms thereof in generally parallel spaced relation and the base arms thereof overlying each other in spaced relation and extending in opposite directions, means for securing said base arms to the spaced adjacent ends of a pair of driving and driven rotatable members, said upright arms being offset out of the spaced planes of said overlying base arms into a common plane lying therebetween, said upright arms having outwardly facing shoulders thereon adjacent their outer ends, a rigid transverse connecting link extending between said upright arms and resting on said shoulders, and a helical tension spring anchored at its opposite ends to the end portions of said arms outside said link and lying along the outer face thereof for urging said upright arms toward each other into abutment with the end portions of said link and for pressing said link against said shoulders.

EDWARD L. BARRETT.